United States Patent [19]
Van Roemburg et al.

[11] Patent Number: 5,740,293
[45] Date of Patent: Apr. 14, 1998

[54] OPTOELECTRONIC DEVICE WITH A COUPLING BETWEEN A SEMICONDUCTOR DIODE LASER MODULATOR OR AMPLIFIER AND TWO OPTICAL GLASS FIBRES

[75] Inventors: Remigius S. M. Van Roemburg; Lukas F. Tiemeijer; Cornelis M. Groeneveld; Willem Schouten, all of Eindhoven, Netherlands

[73] Assignee: U.S. Philips Corporation, New York, N.Y.

[21] Appl. No.: 598,879

[22] Filed: Feb. 9, 1996

[30] Foreign Application Priority Data

Feb. 10, 1995 [EP] European Pat. Off. ............ 95200324

[51] Int. Cl.$^6$ ........................................ G02B 6/36
[52] U.S. Cl. ........................................ 385/92
[58] Field of Search .................. 385/88, 89, 92, 385/93, 94, 49; 372/43; 250/227.11

[56] References Cited

U.S. PATENT DOCUMENTS

| | | | |
|---|---|---|---|
| 4,995,696 | 2/1991 | Mishimura et al. | 385/92 |
| 5,430,820 | 7/1995 | Van Tongeren et al. | 385/88 X |

Primary Examiner—Akm E. Ullah
Attorney, Agent, or Firm—Daniel E. Tierney

[57] ABSTRACT

Optoelectric device having a coupling between a semiconductor diode laser component, such as an amplifier or modulator, and two optical glass fibres. The optoelectronic device has an optoelectronic module comprising a first holder with a semiconductor diode laser component and provided on either side of the component with a second holder comprising a plate with an opening and a lens holder in which a lens is present. The module also comprises a third holder for an optical glass fibre aligned with the component on either side of the component. The second holder comprises a bush which is connected to the plate and within which the lens holder is fastened to the plate, while the bush is provided with at least one opening, near the plate.

22 Claims, 2 Drawing Sheets

OPTOELECTRONIC DEVICE WITH A COUPLING BETWEEN A SEMICONDUCTOR DIODE LASER MODULATOR OR AMPLIFIER AND TWO OPTICAL GLASS FIBRES

BACKGROUND OF THE INVENTION

The invention relates to an optoelectronic device comprising an optoelectronic module which comprises at least a first holder for a semiconductor diode laser modulator or amplifier, referred to hereinafter as amplifier for short, on either side of the amplifier in the radiation path a second holder connected to the first holder and comprising a plate with an opening aligned with the amplifier and provided with a tubular lens holder with a lens, and a third holder for an optical glass fibre aligned with the amplifier arranged in the radiation path on either side of the first holder.

Such devices are frequently used in systems for optical glass fibre communication and form an attractive alternative for the combination of a detector and a laser in the on-line amplification or modulation of signals. They may also be placed immediately, or at least shortly behind a laser, in which case they are called booster amplifiers.

Such a device is known from U.S. Pat. No. 4,995,696 published Feb. 26, 1991. The module shown therein (see FIGS. 3, 5, 6) comprises in a central position an amplifier on a first holder to which a plate-shaped second holder is fastened on either side with an opening aligned with the amplifier and a tubular lens holder with a convex lens. A third holder for a glass fibre is present in the radiation path on either side of the first holder with the amplifier. Between the first holder for the amplifier and the third holder for the glass fibre, there is an optical insulator in the radiation path in this case, while the third holder for the glass fibre here also comprises a further lens, also a convex lens.

A disadvantage of the known device is that the coupling efficiency between amplifier and glass fibres is comparatively low. It was also found in practice that the coupling efficiency often becomes lower during operation of the device, or at least is not stable. In devices comprising a comparatively high number of components, such as the known one in which besides the amplifier there are two glass fibres and four lenses, such problems frequently occur. A reduction of the number of components is not very well possible. It is indeed possible to leave out the two further lenses adjoining the glass fibre when the lenses adjoining the amplifier are aspherical. The problems mentioned above, however, still occur then.

SUMMARY OF THE INVENTION

It is an object of the invention to provide a device of the kind mentioned in the opening paragraph which does not suffer the disadvantages mentioned above, or at least to a much lesser degree, and which accordingly have a high and stable coupling efficiency. Another object is to obtain such a device—still comparatively complicated—which is easy to manufacture.

According to the invention, a device of the kind mentioned in the opening paragraph is for this purpose characterized in that the second holder forms part of the first holder and comprises a bush connected to the plate, the tubular lens holder is fastened to the plate within the bush, and the bush is provided near the plate with at least one opening, preferably three openings. Since the second holder forms part of the first holder, i.e. the first and second holders are made integrally from the same piece of material, the heat transport between the two holders is considerably improved. This means in particular that the heat released during (laser) welding of the lens holder is quickly removed through the first holder, so that the displacement involved therein is a minimum and an optimum alignment is accordingly maintained as much as possible. The bush forming part of the second holder also contributes to this, while at the same time promoting as symmetrical as possible a removal of any heat. A good and symmetrical heat removal is also important in the case of subsequent temperature fluctuations, i.e. during operation of the device, so that also the stability of the coupling efficiency is improved. The fact that the second holder forms part of the first holder and is provided with the bush in addition benefits the mechanical stability and good handling properties of components crucial to the coupling between amplifier and lens, which is an important advantage in the manufacture of the device and afterwards. The bush screens the lens holder and offers a good possibility for coupling other components of the module independently—which is very important—of the lens holder. An important recognition on which the present invention is based is therefore the recognition that the amplifier-lens coupling plays a very important part in the problems identified and that it must be possible to align this coupling independently of the alignment of other components. Owing to the presence of at least one, preferably three openings in the bush near the plate, the lens holder can still be readily fastened on the plate after alignment, preferably again by (laser) welding, in spite of the presence of and screening by the bush.

In an important embodiment of a device according to the invention, an end of the tubular lens holder resting on the plate is provided with a flange. The lens may be aligned in a simple and accurate manner relative to the amplifier through shifting of the flange over the plate in this case, at least as far as the x- and y-directions are concerned (i.e. directions perpendicular to the radiation path). This embodiment is also based on the recognition that the alignment tolerance between the lens and the laser in said x- and y-directions is at its smallest. Such a holder may also be readily fastened to the plate through the opening(s) in the bush, for example by (laser) welding of the flange on the plate. A simple and accurate alignment also in the z-direction (i.e. in the direction of the radiation path) is found in a modification wherein the lens is present in a bush which has been passed with exact fit into the tubular lens holder, which has a smaller diameter than the opening in the plate, and which after alignment in the z-direction is fastened to the tubular lens holder, preferably again by (laser) welding.

Preferably, the device according to the invention also comprises means connected to the first holder for stabilizing the temperature, such as a Peltier element and/or a heat sink. The stability of the relative positions of the amplifier and the first lens, and thus the stability of the coupling efficiency are a maximum in this way.

In a preferred embodiment of a device according to the invention, a tubular fourth holder is fastened to the bush, which holder comprises an optical isolator and is also fastened to the third holder. The glass fibre may also be satisfactorily aligned with the lens in such a device, for example in the x- and y-direction through sliding of the third holder over the fourth holder in these directions, and in the z-direction, for example, through sliding of the tubular fourth holder in the bush. The construction of this embodiment renders possible a very good overall coupling efficiency and also allows for the amplifier-glass fibre coupling to have a comparatively small length. This benefits the homogeneity and the stability of the temperature in the module and the compactness of the module. The fourth holder in this embodiment provides space for an optical isolator. Such a device is particularly suitable for applications where no or at least as little as possible feedback of radiation amplified or to be amplified is desired. The optical isolator in this embodiment will also have a certain degree of temperature stabilization.

An important modification of a device according to the invention comprises no more than one lens at each side of the amplifier, which lenses are aspherical. The choice of an aspherical lens as the first lens means that the device need not contain more than two lenses. This renders the device according to the invention easy to manufacture with a good and stable coupling efficiency. The device may thus also be as compact as possible.

In a particularly favourable modification, the device comprises an optical isolator which is sensitive to the polarization of the radiation to be amplified, and the device is provided with means by which the polarization of the radiation to be amplified by the amplifier is defined. Such a device can be particularly compact because a polarization-sensitive isolator which comprises a polarizer, a Faraday rotator, and an analyser is particularly compact, for example 2 to 5 mm long, and has a diameter of approximately 3 mm with an aperture which is greater than or equal to 1 mm. The means by which the polarization of the radiation to be amplified is defined comprise, for example, a semiconductor diode laser placed immediately in front of, or at least quite close to the amplifier, such as in a booster amplifier mentioned earlier. If the radiation to be amplified passes through a very long glass fibre to the amplifier, a polarization control member such as a PMF (=Polarization Maitaning Fibre) may be included therein.

In another modification which is also very favourable, the optical isolator is not sensitive to the polarization of the radiation to be amplified. A device with this modification is highly suitable for amplifying radiation which has passed through a very long glass fibre, requiring no additional means for defining the polarization of such radiation. Such an optical isolator will generally comprise, besides two diaphragms, an optical rotator or a ½λ plate, and a Faraday rotator, inter alia two double-refraction crystals in which the ordinarius and the extraordinarius enclose an angle of approximately 6° with one another. In a device with four lenses such as the known device, where the radiation beam and the desired beam displacements are approximately 400 μm, this implies that the double-refraction crystals are each approximately 8 mm long. This makes each of the two optical isolators approximately 25 mm long, so that the device according to the invention would become particularly large. In the present modification of the device, the length of the optical isolator preferably lies between 3 and 4 mm, while its diameter lies between 3 and 4 mm with an aperture which is greater than or equal to 1 mm. These particularly small dimensions are realised in particular through the choice of smaller dimensions for the double-refraction crystals. This modification of the device may thus be practically as compact as the modification described above with a polarization-sensitive isolator. This modification is based on the surprising recognition that the combination of a single lens, in particular an aspherical lens, with an optical isolator and a glass fibre renders it possible to make the double-refraction crystals in the isolator considerably smaller than is usual when the optical isolator is between two lenses, while the coupling efficiency is only very slightly reduced thereby (at most by a few percents). Indeed, the core of the glass fibre has a diameter of approximately 10 μm. This renders a beam displacement of 50 μm amply sufficient for causing the radiation to fall outside the glass fibre. This means that a double-refraction crystal need not be more than 500 μm long, so that a polarization-insensitive isolator need not be longer than approximately 5 mm.

In a device according to the invention, the module preferably comprises a box of which at least one side face is provided with at least one row of electrical conductors led through in an electrically insulated manner and within which the first holder and the major portion of the third holder are present. Such an embodiment is, for example, a so-called DIL (=Dual In Line) envelope where the bottom face of the box is provided with two parallel rows of insulated second lead-through conductors, or a so-called BF (=ButterFly) envelope where two parallel side faces of the box are each provided with one row of insulated second lead-through conductors. Both types of envelopes have their own fields of application.

BRIEF DESCRIPTION OF THE DRAWINGS

The invention will be explained in more detail with reference to an embodiment shown in the drawing.

The Figures are diagrammatic and not drawn to scale. Corresponding parts have usually been given the same reference numerals in the Figures.

FIG. 1 diagrammatically shows a plan view, partly cut away, of an optoelectronic device according to the invention.

Figure 1:
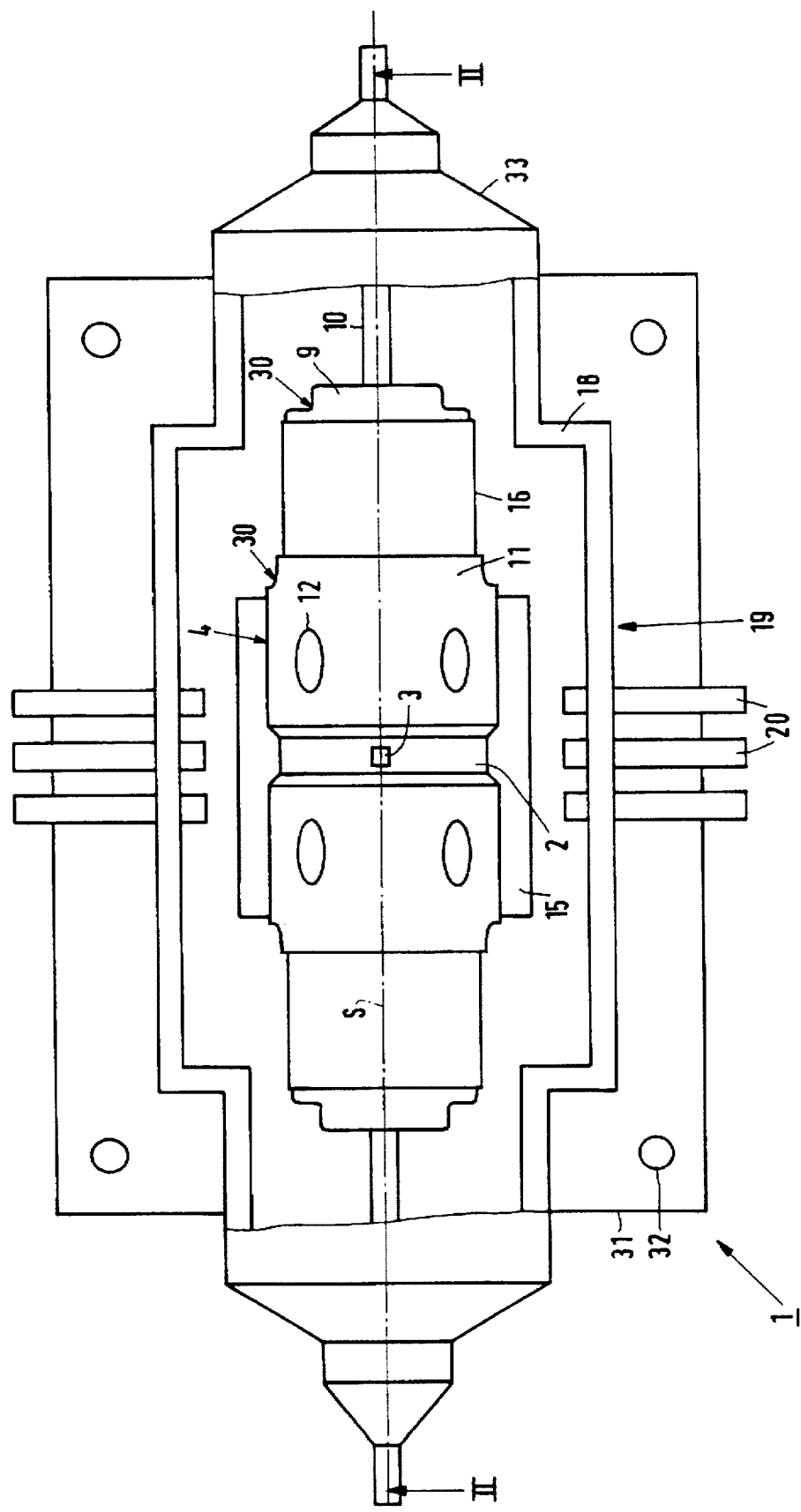
FIG. 1 diagrammatically shows a plan view, partly cut away, of an optoelectronic device according to the invention, and FIG. 2 diagrammatically shows a cross-section of the device of FIG. 1 taken on the line II—II.

According to the invention, the second holder 4 forms part of the first holder 2 and comprises a bush 11 connected to the plate 5, within which bush the lens holder 7 is fastened to the plate 5, while the bush 11 is provided with at least one opening 12 near the plate 5, in this case three openings 12 offset by 120° each time. Firstly, the heat transport in the module 1 is improved thereby, especially from the second holder 4 to the first holder 2. A good heat removal which is as symmetrical as possible from the lens holder 7 renders the coupling efficiency more stable during operation and increases the initial coupling efficiency when the lens holder 7 is fixed by means of (laser) welds, during which heat is generated. The increased mechanical robustness of the first holder 2 resulting from the bush 11 also contributes to this. The bush 11 offers the possibility for coupling further components of the module such as in this case the third holder 3 with the glass fibre 10 via a fourth holder 16. The lens holder 7 is screened by the bush 11 and can be aligned with the amplifier 3 independently of further alignements in the module 1. The coupling efficiency of the device is comparatively high also as a remit of this. Thanks to the presence of the openings 12, the lens holder 7 can still be readily fastened to the plate 5, here by means of laser welds, after alignment while a good coupling efficiency is maintained, in spite of the presence of and the screening by the bush 11.

An end of the tubular lens holder 7 resting on the plate 5 is provided with a flange 13 for this purpose. Before fixation with welds, the lens 8 may be readily aligned in radial direction through shifting of the flange 13 of the lens holder 7 over the plate 5. A good axial alignment is realised here in that the lens holder 7 comprises a bush 14 which fits in the lens holder 7 and which has a diameter smaller than the opening 6 in the plate 5. The heat removal in the module through the first holder 2 is considerably improved here by means of a Peltier cooling element 15.

In the present example, a holder 16, also of tubular shape, is coupled to the bush 11, and a third holder 9 with the glass fibre to the holder 16. The fourth and third holders 16, 9 render it possible to align the glass fibre 10 with the lens 8 in a simple manner in axial and radial directions. Reduced portions 30 of the bush 11 and the holder 16 are suitable for fastening by means of (laser) welds. The fourth holder 16 here also offers space for an optical isolator 17. The latter here is arranged obliquely relative to the radiation path S in order to reduce the reflection sensitivity of the device. The end of the glass fibre 10 in the module 1 is provided with an oblique end face for the same reason.

The lens 8 is aspherical, which renders it possible to give the device a good coupling efficiency with no more than a single lens on either side of the amplifier 3. The device can thus be manufacture comparatively easily and can be very compact. The compact device in the present example may easily offer space to an optical isolator 17 which is sensitive to the polarization of the radiation to be amplified. Such an isolator 17, which comprises a polarizer, a Faraday rotator, and an analyser, is also very compact. In the present example, however, the fourth holder 16 comprises an optical isolator 17 which is not sensitive to the polarization of the radiation to be amplified. In this example, the polarization-insensitive optical isolator 17 nevertheless has small dimensions, i.e. a length of between approximately 3 and 5 mm and a diameter of between approximately 3 and 4 mm, for an aperture which is greater than or equal to 1 mm. This is based on the surprising recognition that in the present example of an alignment of amplifier, (aspherical) lens, and glass fibre, the length of the double-refraction crystals need not be more than approximately 0.3 to 1 mm, while nevertheless a substantially maximum coupling efficiency is possible.

The module 1 here comprises a box 18 of the BF type. This means that two side faces 19 are each provided with a row of electrically insulated lead-through conductors 20. The electrical connections between the conductors 20 and the amplifier 3, and any other optoelectronical components present, is not shown in the Figures. The box 18 is particularly compact: length, width, and height are no more than approximately 20, 12, and 12 mm, respectively. The first, second, and fourth holder 2, 4, 16 and the major portion of the third holder 9 are present in the box 18 of which a bottom plate 31 projects by approximately 5 mm and has holes 32 for further fastening of the device. The portions of the third holder 9 with the glass fibre 10 projecting from the box through openings 34 have usual seals 33 which at the same time act as cord anchorages. The approximately 2 mm thick walls of the box 18 and a lid not shown in the drawing comprise Kovar or Fernico, i.e. iron, cobalt, and nickel alloys. It is further noted that the components of the module 1 are substantially cylindrical except for the box 18.

Figure 2:
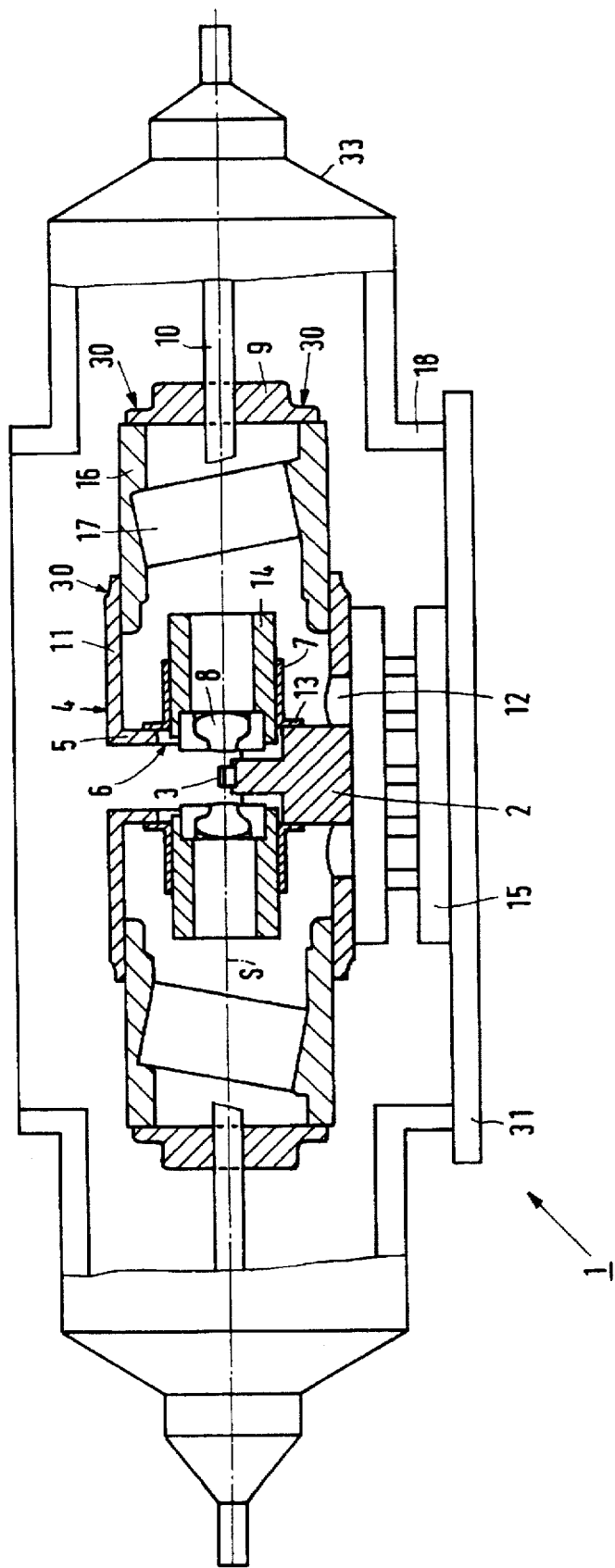
FIG. 2 is a diagrammatic cross-section of the device of FIG. 1 taken on the line II—II. The device comprises a module 1 in which a semiconductor diode laser amplifier 3 is arranged between two glass fibres 10. In the module 1 there is a first holder 2 for the amplifier 3 which is connected to a second holder in the radiation path S on both sides of the amplifier 3, each second holder (see FIG. 2) comprising a plate 5 with an opening 6 aligned with the amplifier 3. The plate 5 is provided with a tubular lens holder 7 with a lens 8. There is also a third holder 9 for the optical glass fibre 10 in the radiation path S on either side of the first holder 2.

The device of the present example is manufactured as follows (see FIGS. 1 and 2). The amplifier 3 is fastened on the first holder 2 together with any other (opto)electronic components. Then the lens 8 is aligned in the lens holder 7 relative to the amplifier 3. This takes place for the x, y-directions by shifting of the lens holder 7 over the plate 5, and for the z-direction by shifting of the bush 14 in the lens holder 7. Then the bush 14 is fastened to the lens holder 7 and the flange 13 of the lens holder 7 to the plate 5 through the openings 12 by means of laser welds. In a similar manner, the fourth holder 16 with the isolator 17 and the third holder 9 with the glass fibre 10 are aligned with the lens 8 and fastened to the first holder 2, the fourth holder 16 being passed into the bush 11 and the third holder 9 being applied against the fourth holder 16. These steps are carried out on both sides of the amplifier 3, i.e. twice. The module subassembly thus obtained is subsequently fastened on the Peltier cooler 15 in the box 18, after which the electrical connections (not shown) between the amplifier 3 plus any further (opto)electronic components present and the electrical conductors 20 are laid, for example wire connections. After the seals 33 have been provided and a lid has been fastened on the upper side of the box 18, the device according to the invention is ready for use.

The invention is not limited to the embodiment described since many modifications and variations are possible to those skilled in the art within the scope of the invention. Thus different materials or different dimensions may be used compared with those mentined in the example. It is noted in particular that further holders may be present in the optoelectronic module between one of the two second holders or one of the two fourth holders and the third holder connected thereto. An attractive so-called two-stage design is formed by the interconnection of the following holders: a third holder for a glass fibre as described in the embodiment, a fourth holder for an isolator as described in the embodiment, a first holder provided with two second holders as described in the embodiment, a fourth holder for an isolator as described in the embodiment, a fourth holder as described in the embodiment but without isolator, a fast holder as described in the embodiment provided with two second holders, a fourth holder for an isolator as described in the embodiment, and finally again a third holder for a glass fibre as described in the embodiment. The two first holders in that case may each be placed on an individual Peltier cooler, while the central two fourth holders are welded together via two flanges fixed to the mutually facing ends of said two fourth holders. On the first holder mentioned first, there is, for example, an amplifier and on the first holder mentioned last, for example, a modulator.

What is claimed is:

1. An optoelectronic device comprising an optoelectronic module including a first holder, a second holder, and a third holder, the first holder being for a semiconductor diode laser component, the second holder being disposed on at least one side of the component in the radiation path (S) and integral to the first holder, the second holder comprising a bush and a plate, the bush extended from the plate and having near the plate at least one opening, the plate having an opening aligned with the component and being provided with a lens holder, the lens holder being fastened to the plate from within the bush, and the third holder being for an optical glass fibre aligned with the component arranged in the radiation path (S) on at least one side of the first holder.

2. An optoelectronic device as claimed in claim 1, wherein an end of the lens holder resting on the plate is provided with a flange.

3. An optoelectronic device as claimed in claim 2, wherein the lens holder comprises a bush which fits into the lens holder and has a diameter smaller than the opening in the plate.

4. An optoelectronic device as claimed in claim 3, wherein the first holder is provided with means for stabilizing the temperature of the first holder.

5. An optoelectronic device as claimed in claim 4, wherein a fourth holder is fastened to the bush of the second holder, which fourth holder comprises an optical isolator and to which fourth holder the third holder is fastened.

6. An optoelectronic device as claimed in claim 5, wherein the lens holder is provided with a lens, and the device comprises no additional lens on either side of the component other than the lens of the lens holder.

7. An optoelectronic device as claimed in claim 6, wherein the optical isolator is sensitive to the polarization of the radiation to be amplified or modulated, and the device is provided with means by which the polarization of said radiation is defined.

8. An optoelectronic device as claimed in claim 6, wherein the optical isolator is insensitive to the polarization of the radiation to be amplified or modulated.

9. An optoelectronic device as claimed in claim 8, wherein the optical isolator has a length which lies between approximately 3 and 5 mm and a diameter which lies between approximately 3 and 4 mm, for an aperture which is greater than or equal to 1 mm.

10. An optoelectronic device as claimed in claim 1, wherein the module comprises a box of which at least one side face is provided with at least one row of electrical conductors led through in an electrically insulated manner and within which the first, second and fourth holder and the major portion of the third holder are present.

11. An optoelectronic device as claimed in claim 1, wherein the lens holder is tubular.

12. An optoelectronic device as claimed in claim 1, wherein the component comprises an amplifier or a modulator.

13. An optoelectronic device as claimed in claim 5, wherein at least one of the lens holder and the fourth holder is tubular.

14. An optoelectronic device as claimed in claim 1, wherein the first holder is provided with means for stabilizing the temperature of the first holder.

15. An optoelectronic device as claimed in claim 1, wherein a fourth holder is fastened to the bush of the second holder, which fourth holder comprises an optical isolator and to which fourth holder the third holder is fastened.

16. An optoelectronic device as claimed in claim 1, wherein the device comprises no lenses on either side of the component other than the lens, and the lens is an aspherical lens.

17. An optoelectronic device as claimed in claim 5, wherein the optical isolator is sensitive to the polarization of the radiation to be amplified or modulated, and the device is provided with means by which the polarization of said radiation is defined.

18. An optoelectronic device as claimed in claim 5, wherein the optical isolator is insensitive to the polarization of the radiation to be amplified or modulated.

19. An optoelectronic device as claimed in claim 6, wherein the lens of the lens holder is an aspherical lens.

20. An optoelectronic device as claimed in claim 1, wherein the second holder forms part of the first holder.

21. An optoelectronic device as claimed in claim 1, wherein the third holder is for an optical glass fibre aligned with the component arranged in the radiation path (S) on both sides of the first holder, and the second holder is disposed on both sides of the component in the radiation path (S).

22. An optoelectronic device as claimed in claim 1, wherein the third holder is for an optical glass fibre aligned with the component arranged in the radiation path (S) on a first side of the first holder, and the second holder is disposed on the first side of the component in the radiation path (S).

* * * * *